Jan. 17, 1950  R. G. SHEIDLER  2,494,903
ELECTRICAL HEATING ELEMENT FOR OVENS
Filed Feb. 27, 1948  3 Sheets-Sheet 1

INVENTOR.
R. G. Sheidler
BY Chas. H. Trotter
Atty.

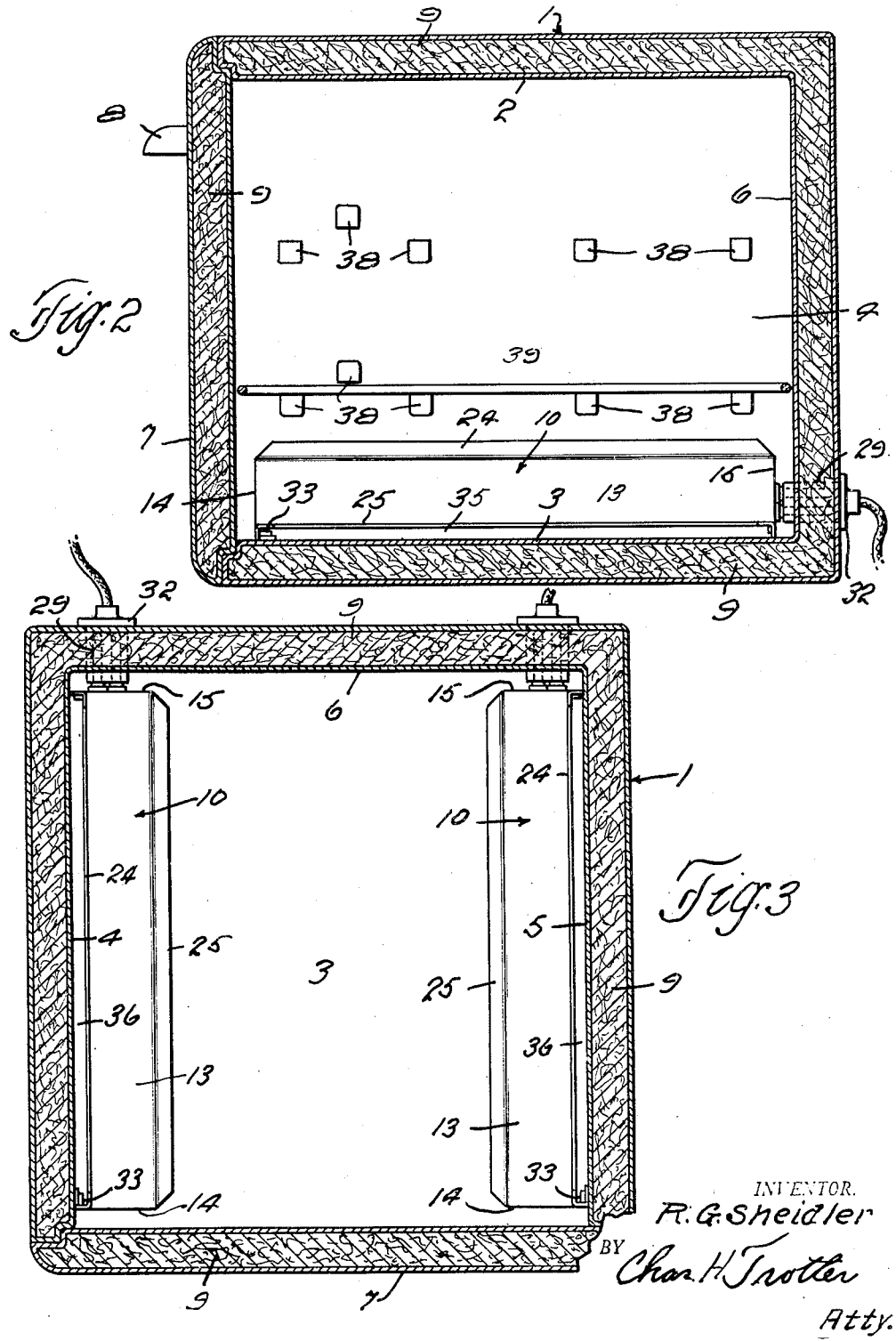

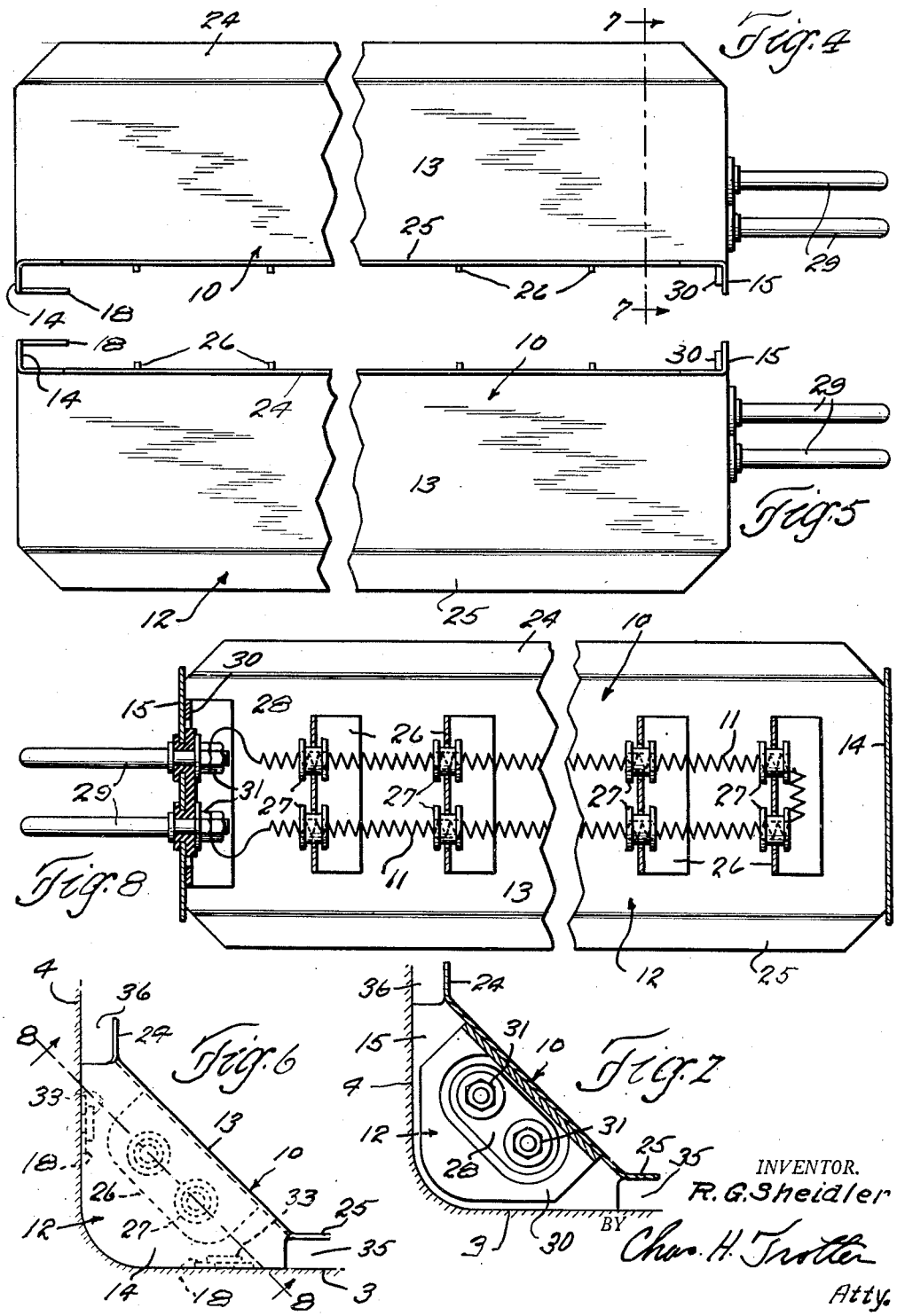

Patented Jan. 17, 1950

2,494,903

UNITED STATES PATENT OFFICE 2,494,903

ELECTRICAL HEATING ELEMENT FOR OVENS

Robert G. Sheidler, Mansfield, Ohio, assignor to The Tappan Stove Company, Mansfield, Ohio, a corporation of Ohio Application February 27, 1948, Serial No. 11,765

6 Claims. (Cl. 219—35)

This invention relates generally to electrically heated ovens of cooking ranges, and more specifically to the arrangement and construction of the heating elements which are removably mounted within the oven itself.

The principal object of the invention is to provide an electrically heated oven in which the heating elements are so disposed within the oven as to create a continuous circulation of two distinct circuits of heated air in such a manner as to produce improved baking results.

Another object of the invention is to provide an improved heating element for cooking range ovens.

Another object of the invention is to provide an improved heating element, for range ovens, having a support for the resistance coils which is so constructed as to protect the resistance coils from spillage and at the same time create the desired circulation of air past the resistance coils.

Another object of the invention is to provide a heating element of this character which can be readily and easily removed from an oven and replaced therein so as to facilitate cleaning of the oven after use.

Still another object of the invention is to provide an oven heating element of this character which is very efficient in operation and yet is easily manufactured at low cost.

Other and more limited objects of the invention will be apparent from the following specification and the accompanying drawings forming a part thereof in which—

Fig. 2 is a vertical section taken on the line 2—2 of Fig. 1, with the oven door in closed position;

Fig. 3 is a horizontal section taken on the line 3—3 of Fig. 1, with the oven door in closed position;

Fig. 4 is an enlarged front elevation of my improved heating element;

Fig. 5 is a top plan view thereof;

Fig. 6 is an end elevation thereof;

Fig. 7 is a vertical section taken on the line 7—7 of Fig. 4;

Fig. 8 is a longitudinal section taken on the line 8—8 of Fig. 6; and

Figure 1:
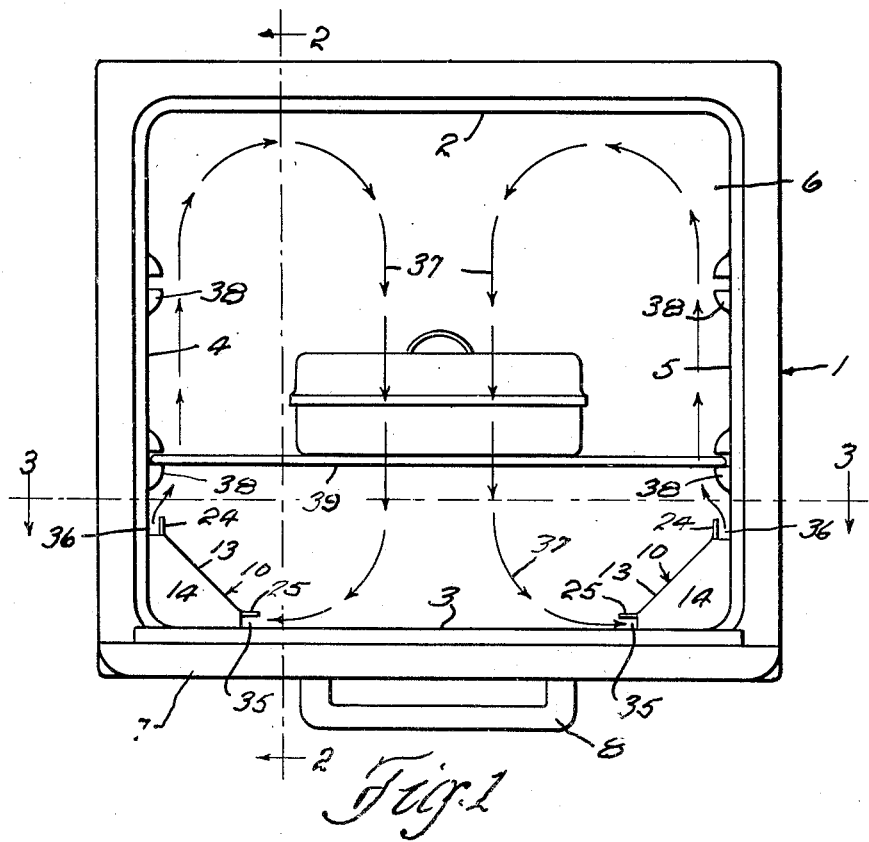
Fig. 1 is a front elevation of a cooking range oven with the door thereof in open position, and showing my improved heating elements mounted therein.

Referring now to the drawings, which illustrate the preferred embodiment of my invention, the numeral 1 indicates generally a cooking range oven having top and bottom walls 2 and 3, side walls 4 and 5 and a rear wall 6. The front of the oven is closed by a door 7 which is pivotally secured in place in any suitable manner and is adapted to be opened and closed through the medium of a handle 8. As shown herein, the walls and door are suitably insulated as indicated at 9.

Figure 9:
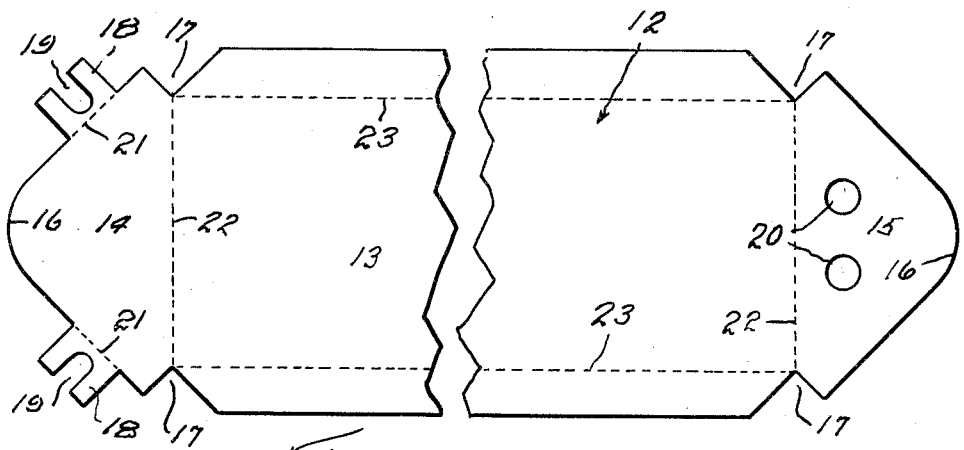
Fig. 9 is a plan view of the blank from which the heating element frame is formed.

Disposed within the oven, one adjacent each lower corner thereof and extending substantially the full length of the oven from the front to the rear thereof, are a pair of heating elements generally indicated by the numeral 10. These heating elements are identical and each comprises a resistance coil 11 which is carried by a sheet metal frame 12. The frame 12 is formed from a single piece of metal, which is first blanked to the shape shown in Fig. 9. This blank comprises an elongated central section 13 and end sections 14 and 15. The end sections 14 and 15 are triangular in shape with the free edges thereof forming an angle of 90° with each other and an angle of 45° with the edges of the central section 13. The apex of each end section is rounded as indicated at 16, and triangular notches 17 are cut in the blank at the junctions of the end sections 14 and 15 with the central section 13. A pair of tags 18, slotted as indicated at 19, project out perpendicular to the free edges of the end section 14, and the end section 15 has a pair of spaced apertures 20 therethrough.

In forming the frame 12, the tabs 18 are first bent up along the dotted lines 21 until they are perpendicular to the end section 14, and then the end sections 14 and 15 are bent up along the dotted lines 22 until they are perpendicular to the central section 13, after which the top and bottom of the central section 13 are bent forwardly along the dotted lines 23 through 45°, to form angular extensions 24 and 25 of the central section 13.

A plurality of angular metal brackets 26 are welded to the rear face of the central section 13 in spaced relation to and in alignment with each other. A pair of insulating spools 27 are mounted in suitable apertures in the free leg of each of the brackets 26. An electrical terminal plug 28 having a pair of prongs 29, which extend through the apertures 20, is suitably secured to the end section 15. An angular bracket 30 which has one leg thereof welded to the central section 13 and the other leg thereof welded to the end section 15 is provided to strengthen the end section 15 and keep it from bending in use. The resistance coil 11 is threaded through and supported by the insulating spools 27 and has the ends thereof connected to the prongs 29 by terminal nuts 31.

As previously stated, a heating element 10 is removably secured in each lower corner of the oven and extends substantially the full length of the oven from the front to the rear thereof. Each element is held in position by the prongs 29, which engage an electric socket 32 mounted in the rear wall 6, and by buttons 33 on the bottom and side walls adjacent the door 7, which engage the slotted tabs 18 on the end section 14. When a heating element 10 is disposed in operative position within the oven, one of the free edges of the end sections 14 and 15 rests upon the bottom 3 of the oven and the other free edge thereof engages one of the side walls. The central section 13 extends crosswise of a corner at an angle of approximately 45°, with the extension 24 spaced from and parallel to a side wall and the extension 25 spaced from and parallel to the bottom wall 3. This construction and arrangement of the heating element in combination with the bottom wall and a side wall of the oven provides an horizontal passageway 35 between the extension 25 and the bottom of the oven and a vertical passageway 36 between the extension 24 and a side wall of the oven. When the resistance coils 11 are energized the air within the oven will continuously circulate along paths indicated by the arrows 37 in Fig. 1, flowing first in through the passageways 35, thence past the resistance coils 11, which heat the air, and then out through the passageways 36.

In order to remove the heating elements 10 to facilitate cleaning and polishing the lining of the oven it is only necessary to gently pull the element forwardly a short distance which disengages the tabs 18 and buttons 33 and withdraws the prong 29 from the sockets 32. The element can then be lifted out of the oven. In replacing a heating element, it is first laid on the bottom of the oven, with the prongs 29 in position to enter a socket 32, and then pushed rearwardly until the prongs 29 fully enter the socket 32 and the tabs 18 engage behind the buttons 33.

The energization of the resistance coils 11 is controlled by a suitable switch (not shown) of standard construction which is placed in a convenient location upon the range. Bosses 38 on the side wall 4 and 5 are provided for supporting an oven rack 39.

From the foregoing it will be very apparent to those skilled in this art that I have provided a very efficient and simple apparatus for accomplishing the objects of my invention. It is to be understood that I am not limited to the specific construction shown and described herein as various modifications may be made therein within the scope of the appended claims.

Having thus described my invention, I claim:

1. In a device of the character described the combination of an oven having top, bottom and side walls and a rear wall, an electric socket secured to the rear wall of said oven, a pair of buttons adjacent the front of said oven, one of said buttons being rigidly secured to the bottom of said oven and the other of said buttons being secured to a side wall of said oven, an electric heating element disposed at an angle to the bottom and to the side walls of said oven adjacent a lower corner thereof and extending substantially the full length of said oven from the front to the rear thereof; said heating element including two spaced parallel end sections and an elongated central section secured to and extending between said end sections, an electric plug secured to one of said end sections and engaging said electric socket, and a pair of tabs secured to the other of said end sections at right angles to each other and engaging said pair of buttons.

2. In a device of the character described the combination of an oven having top, bottom and side walls and a rear wall, and an electric heating element removably secured in a lower corner of said oven; said heating element comprising a frame and an electrical resistance coil carried by said frame; said frame comprising a pair of spaced parallel end sections each of which is adapted to engage the bottom and a side wall of said oven, a central section secured to and extending between said end sections diagonally thereof and adapted when in use to be spaced from the bottom and a side wall of said oven; means carried by one of said end sections operative to removably secure said frame to the rear wall of said oven, and means carried by the other of said end sections operative to removably secure said frame to the bottom and a side wall of said oven.

3. In a device of the character described the combination of an oven having top, bottom and side walls and a rear wall, an electric socket secured to the rear wall of said oven, a pair of buttons adjacent the front of said oven, one of said buttons being rigidly secured to the bottom of said oven and the other of said buttons being secured to a side wall of said oven, an electric heating element removably secured in a lower corner of said oven and extending substantially the full length of said oven from the front to the rear thereof; said heating element comprising a frame and an electrical resistance coil carried by said frame; said frame comprising two spaced parallel end sections, each of said end sections having a horizontally disposed edge adapted to rest on the bottom of said oven and a vertically disposed edge adapted to engage a side of said oven, an elongated central section extending between said end sections and disposed at an angle to said horizontal edges and to said vertical edges, an electric plug to which the ends of said resistance coil are connected secured to one of said end sections, said plug including a pair of prongs adapted to engage said electric socket, and a pair of tabs secured to the other of said end sections at right angles to each other, one of said tabs being adapted to engage said button secured to the bottom of said oven and the other of said tabs being adapted to engage said button secured to the side wall of said oven.

4. In a device of the character described the combination of an oven having top, bottom and side walls and a rear wall, an electric socket secured to the rear wall of said oven, a pair of buttons adjacent the front of said oven, one of said buttons being rigidly secured to the bottom of said oven and the other of said buttons being secured to a side wall of said oven, an electric heating element removably secured in a lower corner of said oven and extending substantially the full length of said oven from the front to the rear thereof; said electric heating element comprising a frame formed from a single blank of sheet metal, and an electrical resistance coil carried by said frame, said frame comprising two spaced parallel end sections, each of said end sections having a horizontally disposed edge adapted to rest on the bottom of said oven and a vertically disposed edge adapted to engage a side wall of said oven, an elongated central section extending between said end sections and disposed at an angle to said horizontal edges and to said vertical edges, an electric plug to which the ends of said resistance coil are connected secured to one of said end sections, said plug including a pair of prongs adapted to engage said socket and a pair of tabs secured to the other of said end sections at right angles to each other, one of said tabs being adapted to engage said button secured to the bottom of said oven and the other of said tabs being adapted to engage said button secured to a side wall of said oven.

5. In a device of the character described the combination of an oven having top, bottom and side walls and a rear wall, an electric socket secured to the rear wall of said oven, a pair of buttons adjacent the front of said oven, one of said buttons being rigidly secured to the bottom of said oven and the other of said buttons being secured to a side wall of said oven, an electric heating element removably secured in a lower corner of said oven and extending substantially the full length of said oven from the front to the rear thereof; said heating element comprising a frame and an electrical resistance coil carried by said frame; said frame comprising two spaced parallel end sections, each of said end sections having a horizontally disposed edge adapted to rest on the bottom of said oven and a vertically disposed edge adapted to engage a side of said oven, an elongated central section extending between said end sections and disposed at an angle to said horizontal edges and to said vertical edges, an extension secured to the lower edge of said central section at an angle thereto and adapted to extend parallel to and in spaced relation to the bottom of said oven, a second extension secured to the upper edge of said central section at an angle thereto and adapted to extend parallel to and in spaced relation to a side wall of said oven, an electric plug to which the ends of said resistance coil are connected secured to one of said end sections, said plug including a pair of prongs adapted to engage said socket, and a pair of tabs secured to the other of said end sections at right angles to each other, one of said tabs being adapted to engage said button secured to the bottom of said oven and the other of said tabs being adapted to engage said button secured to a side wall of said oven.

6. In a device of the character described the combination of an oven having top, bottom and side walls and a rear wall, an electric socket secured to the rear wall of said oven, a pair of buttons adjacent the front of said oven, one of said buttons being rigidly secured to the bottom of said oven and the other of said buttons being secured to a side wall of said oven, an electric heating element removably secured in a lower corner of said oven and extending substantially the full length of said oven from the front to the rear thereof; said heating element including a frame formed from a single blank of sheet metal and comprising two spaced parallel end sections adapted to engage the bottom and a side wall of said oven, an elongated central section extending between said end sections and disposed diagonally of said end sections; an extension extending at an angle to said central section from the lower edge thereof and parallel to and in spaced relation to the bottom of said oven, a second extension extending at an angle to said central section from the upper edge thereof and parallel to and in spaced relation to a side wall of said oven; a plurality of aligned spaced pairs of insulating spools carried by brackets secured to the rear face of said central section, an electrical resistance coil threaded through said insulating spools, an electric plug to which the ends of said resistance coil are connected secured to one of said end sections, said electric plug including a pair of prongs adapted to engage said socket, and a pair of tabs secured to the other of said end sections at right angles to each other, one of said tabs being adapted to engage said button secured to the bottom of said oven and the other of said tabs being adapted to engage said button secured to a side wall of said oven.

ROBERT G. SHEIDLER.

REFERENCES CITED

The following references are of record in the file of this patent:

UNITED STATES PATENTS

| Number | Name | Date |
| --- | --- | --- |
| 1,001,637 | Gray | Aug. 29, 1911 |
| 1,897,879 | Antrim | Feb. 14, 1933 |